United States Patent [19]

Richards et al.

[11] Patent Number: 5,632,848
[45] Date of Patent: May 27, 1997

[54] CONTINUOUS PROCESSING EQUIPMENT FOR MAKING FIBERBOARD

[75] Inventors: Turner W. Richards, Golden Dale, Wash.; Hubert C. Francis, Lithonia; George F. Fowler, Norcross, both of Ga.; Dale R. Greve, Rocky Mountain, Va.; Edward M. Rigby, Salina, Okla.

[73] Assignee: Georgia-Pacific Corporation, Atlanta, Ga.

[21] Appl. No.: 391,423

[22] Filed: Feb. 16, 1995

Related U.S. Application Data

[63] Continuation-in-part of Ser. No. 926,339, Aug. 6, 1992, abandoned, which is a continuation-in-part of Ser. No. 420,362, Oct. 12, 1989, Pat. No. 5,171,366, and a continuation-in-part of Ser. No. 642,834, Jan. 18, 1991, abandoned.

[51] Int. Cl.$^6$ ............... B29C 31/00; B29C 39/42; B32B 31/06; D21H 17/66
[52] U.S. Cl. ............... 156/346; 156/39; 156/536; 162/181.3; 162/381; 425/85; 425/181; 425/371
[58] Field of Search ............... 156/39, 42, 45, 156/346, 347, 352, 536, 580; 106/772, 780, 783; 83/177; 162/181.3, 203, 205, 210, 336, 344, 381; 264/86, 87, 109, 120, 333; 425/85, 181, 317, 335, 371

[56] References Cited

U.S. PATENT DOCUMENTS

| | | |
|---|---|---|
| 2,075,192 | 3/1937 | George . |
| 2,156,311 | 5/1939 | Schuh . |
| 2,322,194 | 6/1943 | King . |
| 2,773,764 | 12/1956 | Park . |
| 2,882,175 | 4/1959 | Bailly . |
| 2,913,308 | 11/1959 | Dailey . |

(List continued on next page.)

FOREIGN PATENT DOCUMENTS

| | | |
|---|---|---|
| 347809 | 12/1989 | European Pat. Off. . |
| 2365161 | 7/1975 | Germany . |
| 84216 | 7/1977 | Japan . |
| 92836 | 8/1978 | Japan . |
| 134814 | 11/1978 | Japan . |
| 106559 | 7/1982 | Japan . |
| 165615 | 9/1984 | Japan . |
| 171261 | 9/1985 | Japan . |
| 1217840 | 3/1986 | U.S.S.R. . |
| 748597 | 5/1956 | United Kingdom . |
| 1435884 | 4/1974 | United Kingdom . |
| 1435433 | 5/1976 | United Kingdom . |
| 1536663 | 12/1978 | United Kingdom . |
| 2053184 | 2/1981 | United Kingdom . |
| WO91/05744 | 5/1991 | WIPO . |
| WO93/11085 | 6/1993 | WIPO . |
| WO94/03318 | 2/1994 | WIPO . |

OTHER PUBLICATIONS

Abstract for A. A. Moslemi, "Inorganically Bonded Wood" Chem. Tech. Aug. 1988, pp. 504–510.

Sattler et al., "Gypsum–Bonded Particleboards and Fiberboards," *Fiber and Particleboards Bonded with Inorganic Binders*, pp. 19–25, (presented orally Oct. 24–26, 1988, copyright 1989).

(List continued on next page.)

*Primary Examiner*—Steven D. Maki
*Attorney, Agent, or Firm*—Synnestvedt & Lechner

[57] ABSTRACT

A continuous manufacturing line for preparing gypsum fiberboard is provided. The manufacturing line includes equipment for admixing hydratable gypsum, paper, and a quantity of water to form a substantially homogenous slurry, dewatering apparatus for removing a portion of the excess water from the slurry to produce a substantially continuous wet web, pressing equipment for configuring the wet web with a compression means to form a substantially continuous green board, a cutting station for cutting the substantially continuous green board into individual uncured lengths, and a heating station for curing the individual uncured lengths to form gypsum-dihydrate-containing fiberboards.

18 Claims, 4 Drawing Sheets

U.S. PATENT DOCUMENTS

| | | |
|---|---|---|
| 3,376,147 | 4/1968 | Dean . |
| 3,390,003 | 6/1968 | Cooper . |
| 3,462,341 | 8/1969 | Littin .................................... 156/348 |
| 3,477,905 | 11/1969 | Rogers . |
| 3,570,208 | 3/1971 | Nikai et al. . |
| 3,736,163 | 5/1973 | Hoopes et al. . |
| 3,839,059 | 10/1974 | Rothfelder et al. . |
| 3,944,698 | 3/1976 | Dierks et al. . |
| 3,951,735 | 4/1976 | Kondo et al. . |
| 3,981,655 | 9/1976 | Horbach ................................ 425/181 |
| 4,045,268 | 8/1977 | Geschwender . |
| 4,047,962 | 9/1977 | Copeland . |
| 4,127,628 | 11/1978 | Uchida et al. . |
| 4,159,302 | 6/1979 | Greve et al. . |
| 4,174,230 | 11/1979 | Hashimoto et al. . |
| 4,214,027 | 7/1980 | Knauf et al. . |
| 4,217,380 | 8/1980 | Medica et al. . |
| 4,222,984 | 9/1980 | Ladwig . |
| 4,239,716 | 12/1980 | Ishida et al. . |
| 4,252,568 | 2/1981 | Bounini . |
| 4,258,898 | 3/1981 | Tuzzolino ............................. 425/181 |
| 4,328,178 | 5/1982 | Kossatz . |
| 4,335,636 | 6/1982 | Porter . |
| 4,557,973 | 12/1985 | Ali . |
| 4,608,108 | 8/1986 | Goll . |
| 4,645,548 | 2/1987 | Take et al. . |
| 4,647,496 | 3/1987 | Lehnert et al. . |
| 4,698,257 | 10/1987 | Goll . |
| 4,734,163 | 3/1988 | Eberhardt et al. . |
| 4,748,771 | 6/1988 | Lehnert et al. . |
| 4,810,569 | 3/1989 | Lehnert et al. . |
| 4,811,538 | 3/1989 | Lehnert et al. . |
| 4,840,688 | 6/1989 | Vogt . |
| 5,342,566 | 8/1994 | Schafer et al. . |
| 5,496,441 | 3/1996 | Tran ......................................... 156/39 |
| 5,520,779 | 5/1996 | Bold ..................................... 162/181.3 |

OTHER PUBLICATIONS

Bahner et al., "New Equipment for Forming Gypsum and Cement Fiberboards from an Aqueous Slurry," *Fiber and Particleboards Bonded with Inorganic Binders*, pp. 94–97, (presented orally Oct. 24–26, 1988, copyright 1989).

R. Miller, "The Wurtex System for Gypsum Fiberboard," *Fiber and Particleboards Bonded with Inorganic Binders*, pp. 103–106, (presented orally Oct. 24–26, 1988, copyright 1989).

Proceedings of the Second International Inorganic Bonded Wood and Fiber Composite Materials Conference, Kraemer and Lempfer, "Gypsum Fiberboard – History and Outlook," 1991, pp. 77–84.

Proceedings of the Second International Inorganic Bonded Wood and Fiber Composite Materials Conference, Natus, G., "Gypsum Fiberboard Production in Nova Scotia, Canada," 1991, pp. 85–87.

Proceedings of the Second International Inorganic Bonded Wood and Fiber Composite Materials Conference, Godfrey, J., "Experiences in Gypsonite Manufacturing," 1991, pp. 88–93.

Proceedings of the Second International Inorganic Bonded Wood and Fiber Composite Materials Conference, Takahashi, Watanabe, Koga and Kaneko, "Gypsum – Cellulose Fiberboard by the Hatschek Process," 1991, p. 94.

Proceedings of the Second International Inorganic Bonded Wood and Fiber Composite Materials Conference, Furman, H., "Marketing Opportunities for Gypsum Fiberboard," 1991, pp. 133–135.

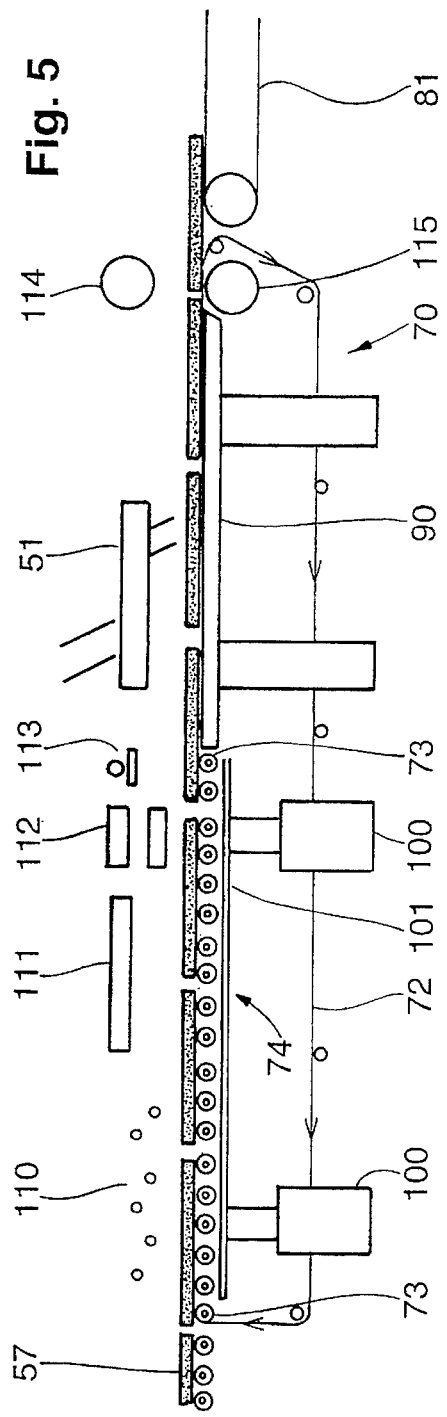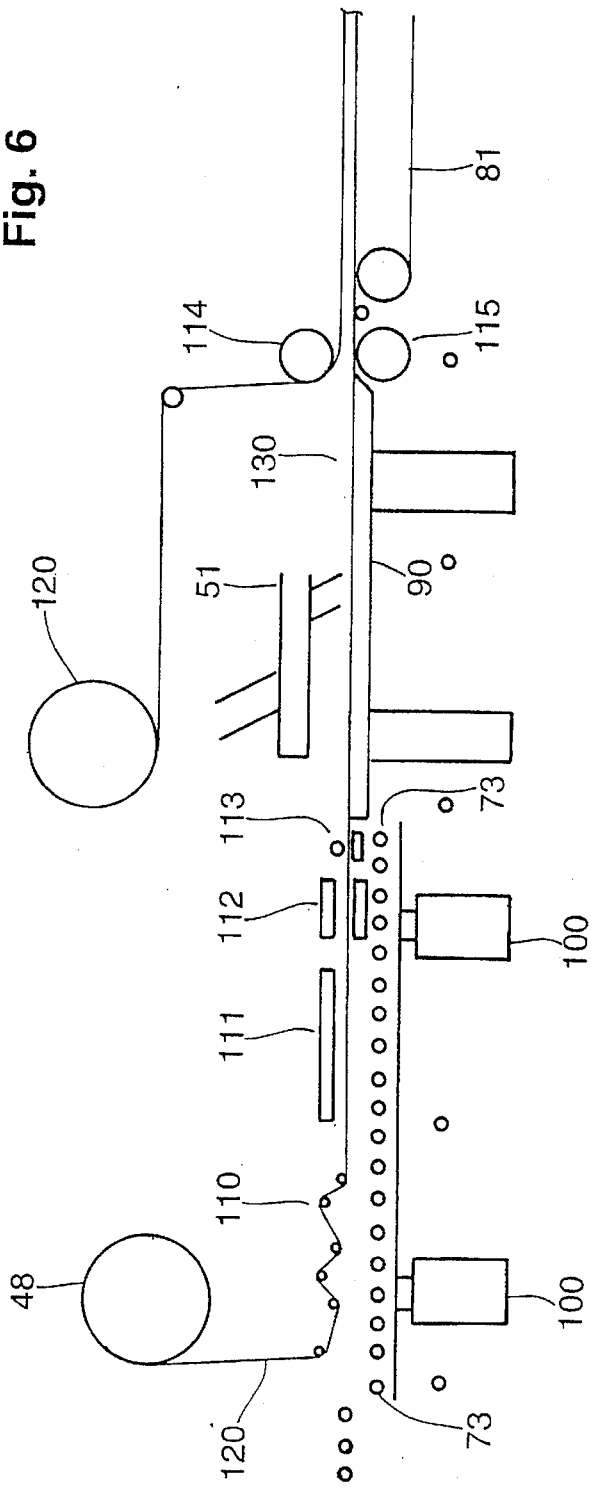

CONTINUOUS PROCESSING EQUIPMENT FOR MAKING FIBERBOARD

CROSS REFERENCE TO RELATED APPLICATIONS

This application is a continuation-in-part of application Ser. No. 07/926,339, filed Aug. 6, 1992, now abandoned which in turn is a continuation-in-part of application Ser. Nos. 07/420,362, filed Oct. 12, 1989 now U.S. Pat. No. 5,171,366 and 07/642,834, filed Jan. 18, 1991, now abandoned each of which are assigned to the Assignee of the present invention and are hereby incorporated by reference.

This application is also related to application Ser. No. PCT/US90/05867, filed Oct. 12, 1990, which application is hereby incorporated by reference.

FIELD OF THE INVENTION

This invention relates generally to equipment for the continuous processing of board-like products containing gypsum, and more particularly, to low cost apparatus for producing fiberboards and wallboards of high strength.

BACKGROUND OF THE INVENTION

Gypsum fiberboard is a construction material made from admixing water, stucco and cellulosic fibers to form a wet mixture, and permitting the stucco, also known as gypsum hemihydrate, to cure to form a set gypsum dihydrate-containing board. Unlike paper-faced wallboard, which is typically a laminar construction including a relatively weak gypsum core disposed between two relatively heavy paper sheets, fiberboard is typically unfaced. It is generally known that wallboard relies upon these paper facings to provide as much as 90% of the requisite bending strength, whereas fiberboard relies upon an intimate mixture of gypsum dihydrate crystals and cellulosic fibers which adhere together to distribute applied forces uniformly throughout the composite structure. This unique feature of fiberboard has made it attractive in applications requiring a high degree of mechanical strength, such as in fire door cores and edge banding.

Early fiberboard manufacturing processes, such as the one disclosed in Porter et al., U.S. Pat. No. 2,076,349, taught the mixing of calcined gypsum hemihydrate, paper fibers, and "excess water" (over and above that required to fully hydrate the hemihydrate gypsum) together to form a slurry. The slurry was placed into a mold and then subjected to a pressure of up to about 1,000 psi so that most of the excess water could be squeezed from the mixture. The resulting "green board", i.e. not fully set, contained about 30–35 wt. % moisture which was later removed by drying in a kiln oven. Fiberboards produced by this process were strong, having modulus of rupture values approaching as high as 1,750 lbs. per square inch, but low efficiency and the costs associated with removing all that water made the boards too expensive. Porter suggested a continuous operation for producing endless webs of fiberboard, which could have helped to alleviate these costs, but his disclosure failed to provide sufficient details for practicing such an operation.

In some of the more modern processes, such as in the method described in Take et al., U.S. Pat. No. 4,645,548, sheet making equipment has been employed to promote more continuous manufacturing of fiberboard. Moreover, readily available and inexpensive forms of gypsum dihydrate, such as flue gas desulfurization and phosphoric acid dihydrate industrial by-products have been employed as a filler in these boards to further reduce costs. Take discloses forming a slurry with a mixture of hydraulic gypsum, gypsum dihydrate, organic and inorganic fibers, a setting retarder, and water. The slurry is taken up on a sheet making roll, which is partially immersed in the slurry bath, and which transfers the slurry to a passing belt. The resulting green sheet is then cut to length, laminated to another board and press-molded. Although this reference teaches that as much as 50 wt. % gypsum dihydrate could be added to the fiberboard initial slurry without significantly affecting board strength, Take's method fails to take full advantage of the bonding properties of gypsum, which are largely due to the crystallization of the hemihydrate into the dihydrate form. Thus, the use of dihydrate as a filler has not been particularly popular.

Recent developments in Germany, such as those disclosed in Kraemer et al., "Gypsum Fibre Boards for the Dry Interior Finish Construction", *Holz-Zentralblatt*, Stuttgart, Vol. 111, No. 11 (January, 1985), suggest that fiberboard can be produced in a continuous "dry process". The dry process, commercialized by G. Siempelkamp GmbH & Co., Krefeld, Germany, begins with a dry mixture of plaster, gypsum, and paper fibers which is thoroughly blended in a high-speed continuous flow-mixer. The mixture is conveyed to a bunker of a matformer, where it is then formed into an endless mat of a dry plaster-gypsum-fiber mix on a spreading belt. The endlessly formed mat is then transferred onto a screen belt and wetted with a minimum amount of water. Vacuum boxes located beneath the wetting unit facilitate the penetration of water through the cross section of the mat. The wetted mat then enters a movable, open cycle press, where it is pressed between a plastic coated texture belt running synchronously on top of the mat. The water squeezed out from the mat is drained into a press pit. After the expiration of the pressing time, the press opens and returns into its initial starting position. The pressed mat is then ready for cutting and subsequent setting and curing operations.

Although the dry process is now used extensively in Europe, comparative testing of gypsum fiberboards produced with the dry and wet processes has demonstrated that boards produced from a slurry containing water over and above that required to hydrate the hemihydrate are more homogeneous in appearance and are about 70% stronger in flexural strength tests than comparable thickness, dry process boards.

Other manufacturers, such as Vogt, U.S. Pat. No. 4,840,688, have sought to combine the benefits of using cheap industrial dihydrate waste as a starting material and the uniformity and strength provided by a wet process in a single manufacturing line. Vogt teaches the wet shaping of gypsum dihydrate and wet-digested fibers, followed by the removal of water, the dry recrystallization of the dihydrate to hemihydrate by heating at atmospheric pressure, and then the subsequent conversion back to the dihydrate by the addition of water. Despite his aggressive attempt at using multiple recrystallizations of gypsum to maximize strength, the complexity and costs associated with Vogt's process detracts from its commercial value.

Accordingly, there is a need for continuous processing equipment for manufacturing gypsum fiberboards having a high degree of uniformity and great strength. This equipment should also be easy to implement and not require complicated elements which would be difficult to maintain and run.

Applicants have recognized an additional and significant disadvantage of prior art equipment, apparatus, and processes. This disadvantage stems from the need in prior processes to purchase expensive equipment to produce fiberboard products and the need to purchase equally expensive equipment to produce wallboard products. Furthermore, because the size of the processing units required to produce such products are physically large, the capital demands associated with putting both a wallboard and fiberboard manufacturing facility on-line according to prior processes severely hampered the commercial viability of such prior equipment and processes. Applicants have discovered a commercially viable alternative which overcomes this substantial deficiency in prior processes and equipment.

SUMMARY OF THE INVENTION

Processing equipment for the continuous preparation of gypsum fiberboard is disclosed by this invention. In a preferred manufacturing line containing this equipment, admixing means are provided for mixing a hydratable gypsum, paper, and a quantity of water in excess of that necessary to completely hydrate the gypsum to form a substantially homogeneous slurry. The line also includes dewatering means for removing a portion of the excess water from the slurry to produce a substantially continuous wet web, pressing means for configuring the wet web to form a substantially continuous green board, cutting means for cutting said substantially continuous green board into individual uncured lengths, and heating means for curing the individual uncured lengths to form gypsum-dihydrate-containing fiberboards.

Accordingly, a cost efficient manufacturing line for making unfaced fiberboard is provided by this invention. This equipment can be adapted for retrofitting to existing wallboard machinery to permit multiple products, such as glass-faced and paper-faced wallboard and fiberboard, to be produced on the same manufacturing line. This apparatus permits in-line dewatering and is capable of manufacturing fiberboards from about ⅛ to about 1.5 inches in thickness by varying the number and size of wedge presses and press rolls, and varying the belt speed.

The process equipment of this invention can include textured rolls for creating light or heavy patterns, such as wood grains, into gypsum and cement fiberboards. Contoured press rolls can be incorporated during pressing for making stepped sheets suitable for siding or roofing applications. Boards having densities of about 30 lbs./ft.$^3$–85 lbs./ft.$^3$ and varying in width from about 6 inches to in excess of about 12 feet are possible. Full wall sections of about 8 feet by 60 feet long can also be fabricated for interior and exterior surface sheathing applications.

Property-improving additives can also be incorporated into the fiberboards of this invention in wet or dry form either through stucco metering or through pulping systems. The pulping system of this manufacturing line can also be used to include water-resistant additives, such as polyhydrogensiloxane, asphaltic wax emulsions, and siliconates, or water-soluble polymers which can be added to increase product strength. Additionally, flue gas desulfurization gypsum, recycled paper, and waste gypsum wallboard can be employed to further reduce the cost of the finished board.

In a more detailed manufacturing line of this invention, a continuous manufacturing line is provided which includes pulping means for mixing paper, water, and hydratable gypsum to form a homogenous suspension, dewatering means including a continuous travelling mesh belt for removing a portion of the water from the homogenous suspension to produce a substantially continuous wet web, pressing means including a wedge press and/or a plurality of press rolls having an increased diameter for forming a substantially continuous green board, cutting means including hydraulic cutters for cutting said substantially green board in at least two directions, and heating means including a multi-layered kiln for curing said individual uncured lengths to form gypsum-dihydrate-containing fiberboards.

STATEMENT OF THE OBJECTS

It is therefore an object of this invention to provide continuous processing equipment for manufacturing gypsum fiberboard from hydratable gypsum and paper fiber.

It is another object of this invention to provide an apparatus for removing large amounts of water efficiently and continuously from a wet gypsum-containing web.

It is a further object of this invention to provide a retrofitted or original equipment manufacturing line which is capable of producing gypsum-containing unfaced fiberboard as well as faced versions of board products.

With these and other objects in view, this invention resides in the novel construction, combination, arrangement of parts, and methods substantially as hereinafter described, and more particularly defined by the attached claims.

BRIEF DESCRIPTION OF THE DRAWINGS

The accompanying drawings illustrate preferred embodiments of the invention as well as other information pertinent to the disclosure, and in which:

FIG. 5: is a diagrammatic view illustrating an apparatus in a fiberboard manufacturing mode in accordance with a preferred embodiment of the present invention; and FIG. 6: is a diagrammatic view illustrating an apparatus in a wallboard manufacturing mode in accordance with a preferred embodiment of the present invention.

DETAILED DESCRIPTION OF THE INVENTION

Figure 1:
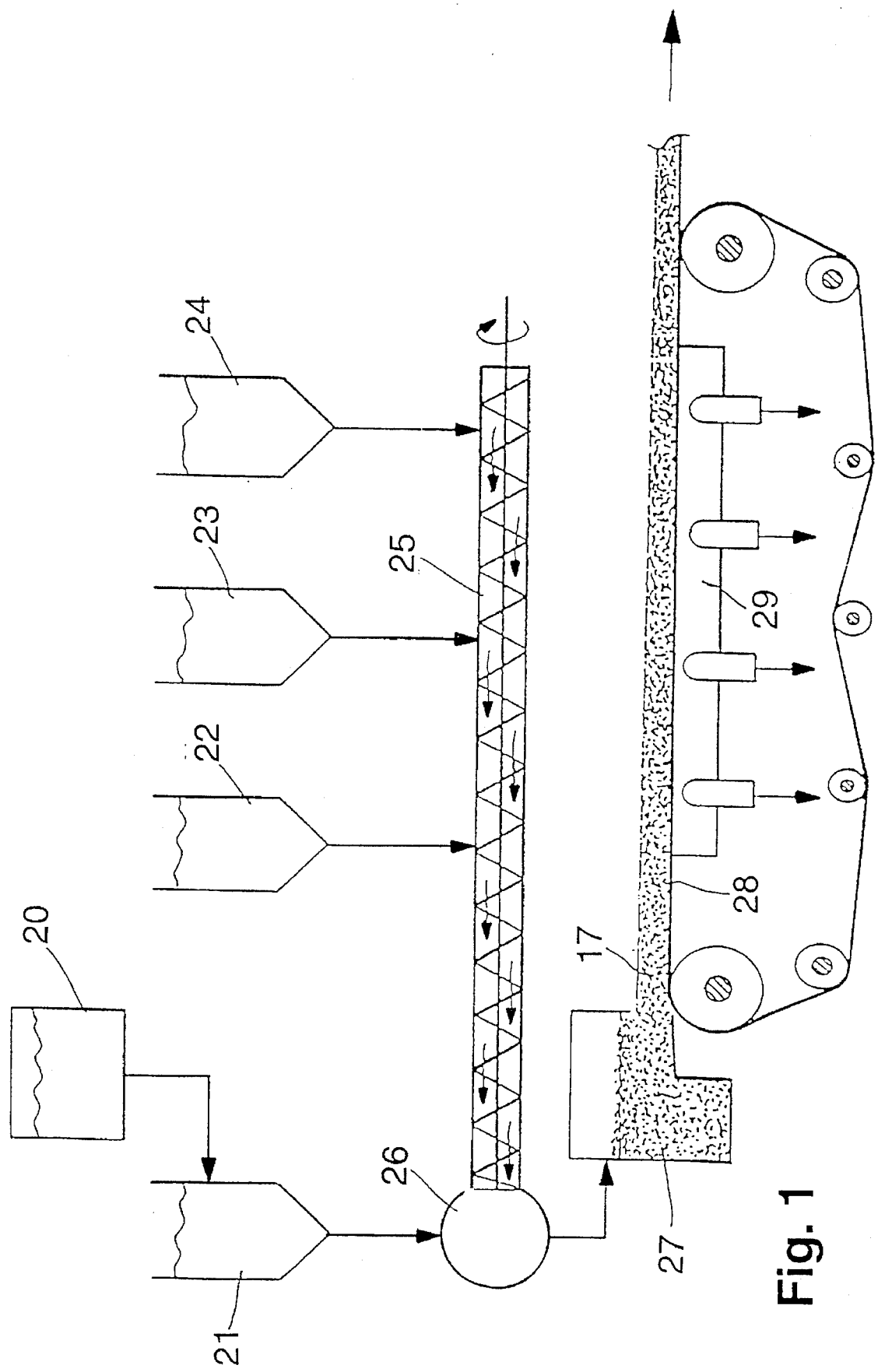
FIG. 1: is a diagrammatic view of the raw material feeding and dewatering sections of a preferred continuous processing manufacturing line of this invention.

One aspect of this invention is directed to a continuous wet processing apparatus for the manufacture of fiberboard. Another aspect of this invention relates to an apparatus which permits the manufacture of both fiberboard and wallboard products from the same production line.

As used herein, the term "hydratable gypsum" refers to both the hemihydrate and the anhydrous forms of calcium sulfate.

Fiberboard Composition and Properties

The preferred ingredients and properties for the fiberboards of this invention will now be described. The preferred fiberboard has a density of about 30–85 lbs./ft.$^3$, preferably greater than about 50 lbs./ft.$^3$, flexural strength of at least 30 lbs. (½ inch thick material), and screw-holding capacity, measured as defined hereinafter, of at least about 400 lbs. These fiberboards preferably do not include a paper facing, which is desirably absent to promote fire and water resistance properties. The composition of the preferred fiberboards is a uniform distribution of solids, which includes by weight, about 65% to about 90% set gypsum dihydrate, about 7% to about 30% cellulosic fiber, and preferably about 1.5% to about 35% of a performance booster selected from inorganic fiber, clay, starch, vermiculite, and binder polymer.

One of the essential constituents of the preferred gypsum-containing fiberboards of the present invention is hydratable gypsum. This constituent is derived from the hydration of any form of calcium sulfate which is capable of reacting with water to form set gypsum, such as, anhydrous calcium sulfate or calcium sulfate hemihydrate. It is believed that the hemihydrate form of calcium sulfate will be used most widely. Of the "alpha" and "beta" forms of the hemihydrate, use of the latter is preferred from the perspective of cost while the alpha form is generally preferred from the perspective of processing conditions and performance properties. A combination of alpha and beta forms can also be used. The hemihydrate is produced from the naturally-occurring gypsum mineral by heating, or calcining, the dihydrate.

As mentioned above, one of the advantages of the present invention is that waste-type materials can be used in fabricating the fiberboards. For example, there can be used as the source of the calcium sulfate the material known as "desulfurized by-product gypsum" which is produced by the desulfurization of flue gas. Another example of a waste- or scrap-type material that can be used in the practice of the present invention is scrap gypsum wallboard, which can be used as a source of both calcium sulfate and the paper constituent of the building product. For this purpose, scrap paper-faced gypsum wallboard can be ground into suitably small particles which are calcined in water under pressure and in the presence of a crystal modifier to form calcium sulfate hemihydrate. Scrap gypsum wallboard can also be transformed into a suitable material for use in the practice of the present invention by grinding and calcining it at atmospheric pressure. Sufficient water can be used to form the desired pulp-type material from which the product is conveniently made. This invention can employ any of the above-disclosed individual sources of calcium sulfate, but a mixture of the different sources of calcium sulfate can also be used.

In the use of an aqueous dispersion to make the gypsum-containing fiberboards, the non-fibrous calcium sulfate preferably comprises between about 53% and about 97% by weight of the total solids, and more preferably between about 55% and about 93% by weight, depending upon the specific application.

The gypsum dihydrate content of the preferred fiberboards of this invention will be approximately 17–18.5 wt. % greater than the calcium sulfate hemihydrate content of the compositions from which they are made, the difference representing the added water of hydration in the set gypsum dihydrate. That is, by weight, the set gypsum will broadly be within the range of about 50% to about 97%, and preferably between about 60% and about 94% of the overall set composition.

The composition of the preferred fiberboards of this invention also employs a substantial amount of cellulosic fiber. Cellulosic fiber includes the fibrous component of plants, such as cotton, linen, and flax, for example. Among the various sources of cellulosic fiber, paper stock is conveniently employed. That is, the solid component involved in each of the aforesaid aspects of the invention preferably includes by weight about 3% to about 30% paper fiber, more preferably between about 6 and about 17%. Building materials intended for use in various specific products may contain somewhat different amounts of paper fiber. The presence of the paper fiber makes it possible to produce building materials having good physical characteristics such as flexural strength, screw and nail holding ability, and surface hardness without having any separate surfacing membrane such as the paper facing used on conventional gypsum wallboard.

The paper fiber can be derived from either virgin paper stock, or previously used, waste paper stock. The source of the paper can be wood, cotton or linen rags, straw, etc., the origin or history of the paper not being important factors. The paper may be a product of the sulfite process, the sulfate (Kraft paper) process, or other processes. Among the types of paper stock that have been successfully employed are virgin and brown Kraft papers, and especially, newsprint. Waste newspaper provides very satisfactory results, is inexpensive, and its use helps to overcome an environmental pollution problem. And, as mentioned above, the source of the paper stock can include the paper of ground paper-faced gypsum wallboard.

Fiberboards within the scope of this invention desirably and preferably include one or more performance boosting additives, their specific nature depending to some extent on the intended utility of the final product. In almost every case, there will be desirably used one or more defoaming agents, dispersants, and accelerators, ingredients which are well-known in the art and are employed at low concentration levels, generally each at less than about 1% by weight of the solids. In the aggregate, the performance booster generally will comprise about 1.5% to about 35% by weight of the solids and will preferably be selected from starch, inorganic fiber, clay, vermiculite, and binder polymer.

Inorganic fiber, as that term is employed herein, includes glass textile fiber and mineral wool. These latter terms are defined in U.S. Pat. No. 4,557,973, and those definitions are incorporated herein by reference. Briefly, the term "mineral wool" means glass or other mineral fibers prepared by attenuating a melt of glass, basalt, blast furnace slag or other vitreous mineral composition from the face of a heated centrifugal rotor or the like. This process is in contrast to that used to produce textile fibers, where the melt is drawn through an orifice. An especially useful and readily available type of mineral wool is glass wool as found in glass wool insulation material. Glass textile fiber and glass wool, jointly or severally, are referred to herein as "siliceous fiber." As employed in this invention, the glass textile fiber, also referred to herein as "fiberglass", generally will be chopped, e.g., the fibers may be about ½ inch long.

The fiberboards of this invention also preferably include siliceous fiber. Siliceous fiber improves the fire resistance of the building materials and other products of this invention, apparently by decreasing the tendency of the gypsum construction to crack under thermal stress. The siliceous fiber preferably comprises up to about 7% by weight and may include glass textile fiber and, in addition, glass wool, depending upon the specific product.

The performance booster may also include either clay or vermiculite, or both, especially if the intended board or panel requires excellent fire resistance. Both of these materials may be present in amounts up to about 6%, preferably about 3% to about 4% by weight of the solids. The clay to be employed will generally be kaolin clay, which is effective to control the shrinkage of fiberboards under extreme heat. The vermiculite is preferably raw, or unexpanded vermiculite, which swells when heated, helping to control shrinkage of the construction and possible cracking. The requirement for the presence of these materials depends somewhat on the intended use for the final product.

The composition of the preferred fiberboards of this invention may also include a binder. The binder affects the physical properties of the fiberboards, especially their flexural strength, and also permits good fastener retention at lower density. Furthermore, the binder improves the surface characteristics of the board such as smoothing the surface and making it easier to finish. Both natural binders, such as raw, uncooked starch, and binder polymers, further described below, are available for providing these characteristics.

The binder polymer, when present, may comprise up to about 15% by weight of the solids, but preferably about 1% to about 3% by weight. A number of different polymeric materials may be employed as the binder polymer, including homopolymers, such as poly(vinyl acetate) and polyacrylate, as well as copolymers, such as poly(ethylene)-co-(vinyl chloride), poly(styrene)-co-(butadiene), and poly(vinyl acetate)-co-(methyl acrylate). Among the various binder polymer possibilities, esters of poly(vinyl alcohol) are especially effective, and poly(vinyl acetate) homopolymer is preferred. It is also convenient in most cases to introduce the binder polymer as an aqueous emulsion, many of which are commercially available. In selecting the binder polymer it is preferred to employ thermoplastic resins, which when applied to the surface of the fiberboards tend to form a tough, forgiving film, rather than a brittle film or one which is soft and has a very low tensile strength. Thermoplastic resins are also preferred since the heat required to set a thermosetting resin tends to calcine the gypsum in the preferred fiberboard compositions of this invention. One particularly useful resin emulsion, which is suitable for use as the resin polymer of the preferred fiberboard composition is UCAR-130 poly-(vinyl acetate) polymer by Union Carbide.

The composition for preparing the fiberboards of this invention can also include water in an amount in excess of that required to react with and hydrate the calcined non-fibrous gypsum. According to preferred embodiments, the fiberboard forming compositions comprise at least about 8-fold, and more preferably, from about 12- to about 100-fold excess water can be present in wet processes. The wide range of excess water contemplated by the present invention reflects the flexibility of the present process with respect to paper content. For example, it is contemplated that the amount of water will increase due to pulping requirements as the concentration of the paper in the product increases.

Fiberboard Continuous Process and Equipment

Although the fiberboard compositions of this invention may be formulated in many different ways, and any number of different techniques may be employed, including both "dry" and "wet" processes, to produce the panels and boards of this invention, a manufacturing line which is preferred for making these structures is illustrated diagrammatically in FIGS. 1–6. As used herein, "dry" processes employ a minimum amount of water necessary for hydration of the gypsum dihydrate, or only a minor amount of excess water, for example, from about 17–100% water (based upon the weight of the gypsum dihydrate), where as "wet" process employ over about 150% water, and preferably in excess of about 250% (about 15-fold the amount necessary for complete hydration).

Hydratable gypsum, or in certain instances, cement, is delivered from gypsum bin 22 to a metering system, such as a feeder screw 25. If gypsum is used, it preferably comprises stucco, i.e., gypsum hemihydrate. The stucco may be mixed with cut glass fibers from bin 23 and other ingredients from bin 24, such as clay, vermiculite, and starch. Waterproofing agents, such as silicones (e.g. polyhydrogensiloxane), siliconates, such as potassium of sodium siliconate, asphalt wax emulsions, and combinations thereof, can be added directly to the slurry in the mixing means 26, the pulper, or into the gauging water.

Preferred starting compositional ranges and starting weights for the primary ingredients are as follows:

TABLE I

Initial Fiberboard Slurry Composition

| Weight/Ingredient | Broad Range | Narrow Range | Target |
| --- | --- | --- | --- |
| 7,619 lbs. water | 65–85 wt. % | 70–80 wt. % | 78.2 wt. % |
| 275 lbs. paper | .5–6 wt. % | 1–4 wt. % | 2.8 wt. % |
| 1,850 lbs. stucco | 10–30 wt. % | 15–25 wt. % | 19.0 wt. % |
| 9,744 lbs. | | | TOTAL 100.0 wt. % |

The preferred wet composition contains about 412 wt. % water (based upon the dry weight of stucco; or about 24.6 fold in excess of that required to completely hydrate the gypsum) and about 13 wt. % paper (from 3.6% pulp solution) based on the dry weight of paper and stucco. Of the 7,619 lbs. of water added to the initial composition, it is expected that 6,109 lbs. will be drained during dewatering, 310 lbs. will be incorporated in the fiberboards to hydrate the stucco to form gypsum dihydrate, and 1,299 lbs. will be lost to evaporation in the dryer.

The paper fiber, which is an important ingredient in the fiberboard according to certain preferred embodiments, is preferably recycled newspaper which is pulped, in at least about 20 times its weight in water into individual fibers in a pulper 20, preferably to about a 3–5 wt. % pulp-in-water solution; although some modern pulpers are known to accommodate about a 6–9 wt. % pulp-in-water solution. In order to reduce the length of the dewatering operation, a vacuum filter may be employed to reduce the water content of the pulp, following wet fiberization, to as high as about 25 wt. % pulp-in-water solution.

Additionally, siliceous fiber, such as glass wool, may be pulped separately or with the paper in at least about 20–25 times its weight in water, and added to the pulp feeder 21 with the paper fiber. In contrast to that which has been taught previously in the gypsum arts, such as in U.S. Pat. No. 4,557,973, it is not necessary in the process described above to pretreat the glass wool with powdered gypsum prior to its use.

The pulped ingredients are then pumped to a slurry mixer 26 where the paper pulp, and other pulped ingredients if desirable, are intimately mixed with the gypsum and other dry additives. The slurry mixer 26 can be a conventional wallboard gypsum mixer, a high-torque centrifugal pump, or the like. The slurry mixer 26 preferably receives the dry gypsum and other ingredients, thoroughly mixes the ingredients, and pumps them through to a slurry roll or head box 27. The slurry mixing means thus preferably comprises pumping means, such as a blender having a conical cavity. The pumping means may further comprise a torque flow pump fluidly connected to the conical cavity of the pumping means for pumping the homogeneous suspension.

The head box 27 holds the mixture of gypsum, pulp, and other ingredients in suspension and spreads them evenly as a slurry 17 onto a travelling mesh belt 28. The thickness of the slurry 17 which is deposited onto the belt 28 is determined by the consistency of the inlet material and the speed of the belt 28. The starting slurry thickness for producing a 0.5 inch board is preferably about 1.6–2.0 inches, more preferably about 1.7 inches.

The travelling mesh belt 28, as with all the belts in this process, moves approximately 25–100 ft./min. preferably about 50 ft./min. The dewatering of the slurry 17 through the mesh is assisted by a series of drain pipes 29 which can be vacuum-assisted for facilitating the removal of water.

Figure 2:
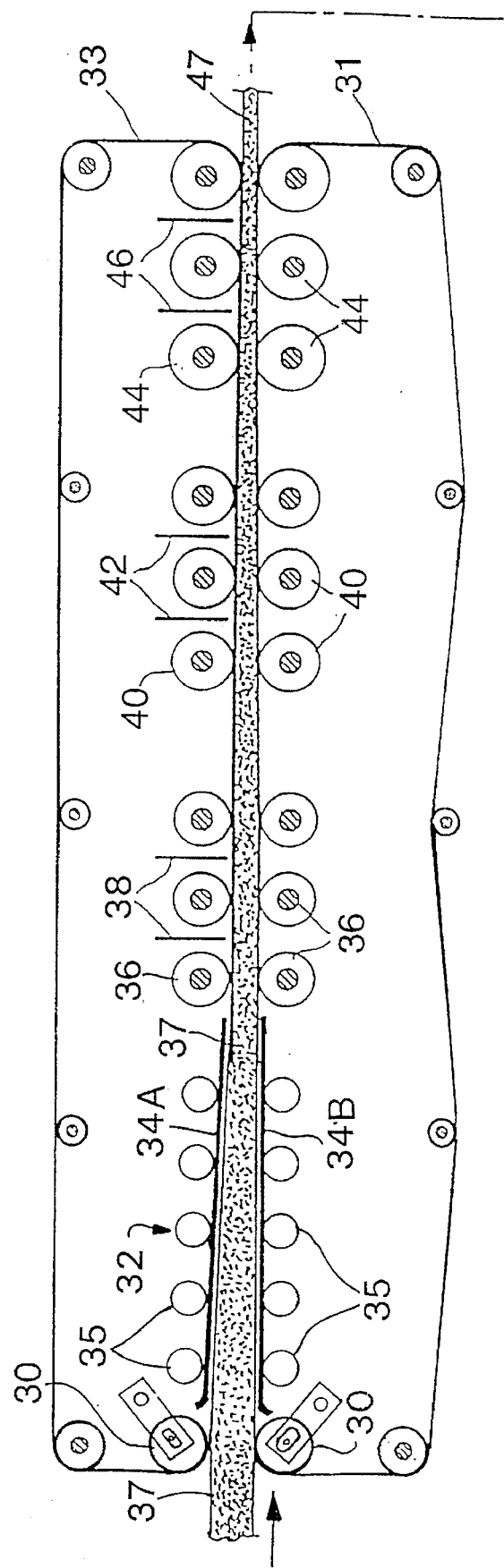
FIG. 2: is a diagrammatic view of the press section portion of a preferred manufacturing line of this invention.

Following the initial dewatering step, the slurry 17 is reduced to a soft web 37 which is introduced to an adjustable prepress roll 30, as illustrated in FIG. 2. The soft web 37 at this point in the process has a thickness of preferably about 1.1–1.3 inches, more preferably about 1.2 inches, and a water content of about 70.2 wt. %. The prepress roll 30 can be set for various nip thicknesses and can be equipped to introduce porous top and bottom belts 33 and 31, respectively.

The web 37 is then delivered by the porous belts 31 and 33 to a wedge press, indicated generally as 32. According to the illustrated embodiment, the wedge press 32 comprises upper and lower perforated plates 34A and 34B which relatively rapidly reduce the thickness of the web 37. The perforated plates 34A and 34B are supported by rolls 35. The wedge press 32 may also contain vacuum boxes, suction slices, and the like, for helping to remove water which enters through the belts. The thickness of the web 37 at this point in the process is approximately 0.85–0.925 inches, preferably about 0.89 inches, and the water content is about 62.2 wt. %.

The wet web 37 then enters a first press roll section shown in FIG. 2, which includes three 18 inch press rolls 36 and suction slices 38. The porous belts continue through this first press section. The thickness of the web at this point in the processing is approximately 0.640–0.690 inches, preferably about 0.67 inches, and the water content is about 52.8 wt. %.

The web 37 then enters a second press roll section which includes three 24 inch press rolls 40 and the same top and bottom belts 33 and 31 with vacuum-assisted suction slices 42. The thickness of the web 37 at this stage is approximately 0.53–0.550 inches, preferably about 0.54 inches, and the water content is about 44.6 wt. %.

Finally the web 37 is introduced into the last press roll section which includes three 36 inch press rolls 44 and vacuum-assisted suction slices 46. At this point in the pressing, a new bottom belt 53 is preferably introduced, although the board now has sufficient green strength to be processed on rolls 50, without belts. The thickness of the web is now about 0.5 inches and the water content is about 41.5 wt. %, which represents the 310 lbs. of water needed for hydration and the 1,299 lbs. of water to be evaporated in the dryer. The above-described dewatering and pressing operations can be summarized as follows:

TABLE II

Thickness of Web or Board vs. Wt. % $H_2O$

| Line Location | Web or Board Thickness (inches) | Wt. % of $H_2O$ Based on Total Wt. % of Ingredients | |
| --- | --- | --- | --- |
| | | Broad Range | Target |
| Head Box | 1.70 | 60–100 | 78.2 |
| Pre-Press Roll | 1.20 | 60–80 | 70.2 |
| Baby Rolls | .89 | 50–70 | 62.2 |
| 1st Press Section | .67 | 40–60 | 52.8 |
| 2nd Press Section | .54 | 40–50 | 44.6 |
| 3rd Press Section | .50 | 35–45 | 41.5 |

Although specific press sections have been described, the pressing operation of this invention may consist of a varying number and size of wedge presses and press rolls, and may contain contouring, profiling, or embossing rolls for individual product needs. Additionally, the rolls in each press section may contain ridges or drilled holes for carrying away water from the wet web. The main purpose of the press section of FIG. 2 is to define caliper and density while simultaneously removing water.

As the web leaves the press section, it is in a form of a "green" board 47, i.e., is not past its initial stiffening point. See U.S. Pat. No. 4,643,771 for an explanation of the various curing stages of gypsum boards, which is hereby incorporated by reference.

Figure 3:
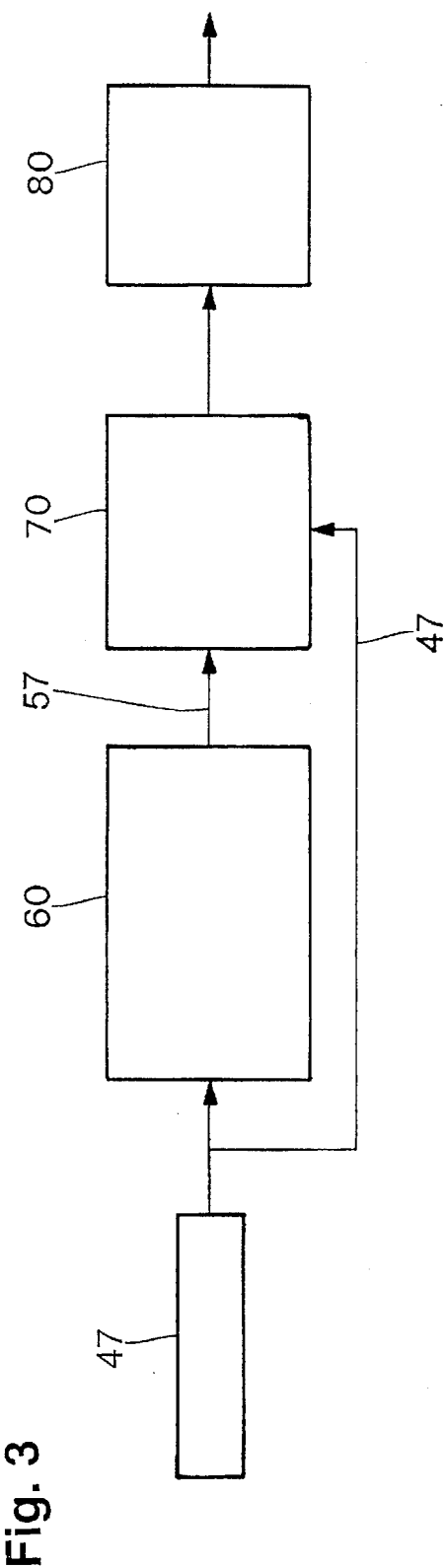
FIG. 3: is a schematic view in block diagram form of the fiberboard cutting section, the fiberboard carrying means and the wallboard/fiberboard fiberboard carrying means in accordance with a preferred embodiment of the present invention.

As illustrated in block diagram form in FIG. 3, the green board 47 is preferable introduced into cutting means 60 where the substantially continuous lengths thereof are cut to either a final dimension or some intermediate dimension. It will be appreciated by those skilled in the art upon a complete reading of the present specification, however, that the location of the cutting means 60 relative to the other equipment can be varied within the scope of the present invention.

Figure 4:
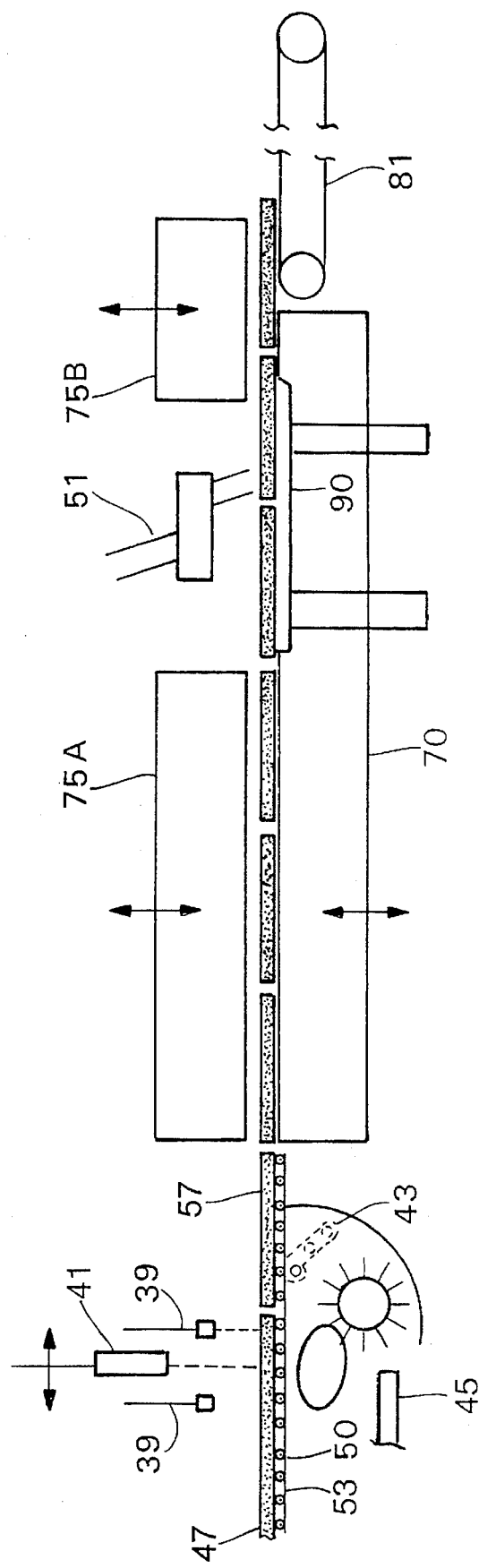
FIG. 4: is a semi-schematic view in partial block diagram form of the fiberboard cutting section, the fiberboard carrying alternating means, substrate introducing and withdrawing means and the wallboard/fiberboard carrier means in accordance with a preferred embodiment of the present invention.

With reference now to FIG. 4, a more specific embodiment of the cutting means 60 is illustrated. According to this embodiment, the green board 47 is preferably cut to length and trimmed with water jets 39 and 41. The water jets preferably use about 1,800–2,600 psi, more preferably about 2,200 psi water pressure and include side trimmers 39 and a chain driven length cutter 41 angled at about 45° to the processing line for cutting the running board square. Because the green board 47 is very soft, the water jets cut effortlessly through the thickness to trim the boards to about their final length and width dimensions.

The cutting means 60 also preferably includes repulpers 43 following the trimmers 39 for receiving the edge trim refuse, as well as entire scrap boards, which can be reground, mixed with water from nozzle 45 to form a slurry, and transferred back to the starting tanks or slurry mixer for recycling.

An important and critical aspect of certain embodiments of the present invention will now be described in connection with the remaining portions of FIGS. 3–6. With particular reference to FIG. 3, the green board 47 which exits the press section is introduced, either before or after cutting, to means 70 for selectively receiving the green boards 47/57 and carrying them to a common wallboard/fiberboard carrier means 80. As used herein, the terms "selective receiving" and the like refer to means which are readily adaptable to either receive the green board or not. According to preferred embodiments, the selective receiving means comprises a carrier means 71 and means (represented by the vertical arrow 72 through block 71 in FIG. 4) for selectively introducing and withdrawing said carrier means from operative association with the green boards 47/57 and/or the fiberboard/wallboard carrying means 80,. Of course, the cutting means 60 may be located downstream of the selective receive means 70, in which case means 70 will receive the uncut lengths of green board 47.

In addition, the preferred embodiments of the present invention further comprise means for selectively introducing and withdrawing conventional wallboard components and equipment from operative association with one another and/or with the fiberboard/wallboard carrying means 80. More particularly, conventional wallboard products include both a bottom facing and top facing which serve to sandwich the gypsum core, which is initially dispensed in the form of slurry onto the bottom facing or substrate. Accordingly, the present invention includes means for providing wallboard substrate components and means for introducing wallboard-forming gypsum slurry onto the bottom facing sheet. Applicants have discovered that the ability to economically and effectively produce both fiberboard and wallboard in a single apparatus is greatly enhanced by providing means for selectively introducing and withdrawing wallboard substrate components from operative association with means for dispensing wallboard-forming gypsum slurry. In the particular embodiment illustrated in FIG. 4, the substrate introducing and withdrawing means comprises means 75A for introducing a bottom wallboard substrate and means 75B for introducing a top wallboard substrate, and the slurry dispensing means comprises means 51 for discharging a gypsum slurry over a stationary forming table 90. Paper and glass mat are examples of wallboard substrates which are today commonly employed.

In a preferred embodiment of the present invention, as shown in FIGS. 4–6, the common wallboard/fiberboard carrier means 80 comprises an endless carrier belt 81 of conventional configuration. Of course the carrier means 80 could include other conventional means, provided the means employed is adaptable for carrying fiberboard and wallboard. For example, the carrier means 80 may comprise in certain embodiments a series of rollers.

Due to the configuration described herein, the preferred apparatus of the present invention are capable of operating in and readily switching between a fiberboard manufacturing mode and in a wallboard manufacturing mode. With particular reference to FIG. 5, a preferred apparatus configured to operate in fiberboard manufacturing mode is illustrated as including a fiberboard carrying means 70 in operative association with cut green boards 57 and with carrier belt 81. In the illustrated embodiment, means 70 comprises an endless belt 72 adapted to travel in the indicated direction. Belt 72 travels along supporting rolls 73 and thereby carries boards 57 from the cutting means, across the stationary forming table 90, and to the fiberboard/wallboard carrier belt 81. According to important aspects of preferred embodiments, the carrying means 70 includes adjustment table, indicated generally as 74, which carries the plurality of supporting rolls 73 and is capable of moving the supporting rolls and the belt 72 into and out of operative association with the green boards 57. More particularly, the adjustment table 74 preferably includes means 100 for alternatively and selectively raising and lowering the supporting rollers 73. Although it is contemplated that several mechanisms may be adapted for use as the raising/lowering means, a preferred mechanism comprises a plurality of screw and/or hydraulic jacks supporting the adjustment table top 101.

The tensioner 110, heater 111, guide 112, creaser 113 and pin mixer 51 are wallboard-forming devices and are not operative in the mode illustrated in FIG. 5. In addition, top forming roll 114 is also a wall-board forming device, and it is also not operative in the fiberboard forming mode, as described more fully immediately below. However, the bottom wallboard forming device 115, which is shown as forming plate but may comprise forming rolls, may be utilized as a supporting/guide roll in the fiberboard forming mode, as illustrated in FIG. 5.

One preferred purpose of the means 70 for selectively receiving the green boards 47/57 and carrying them to a common wallboard/fiberboard carrier means 80 is to permit the gypsum to slowly set as it is conveyed. The substantially set boards are then oven dried prior to conventional trimming of the water-cut ends and edges, sanding, and silicone sealing operations.

In order to convert from the fiberboard forming mode (FIG. 5) to the wallboard forming mode (FIG. 6), the screw jacks 100 are operated to lower the support rolls 73, and the belt 72 is removed from the forming table 90 and from the forming roll 115. This permits tensioner 110, heater 111, guide 112 and creaser 113 to be lowered into operative association with the forming table 90 and the pin mixer 51. More particularly, this mode of operation permits a facing material 120 from roll 48 to be introduced into tensioner 110, below heater 111, through guide 112 and creaser 113, across forming table 90, under pin mixer 51, between forming rolls 114/115 and onto carrier belt 81 without interference from supporting rolls 73 or belt 72. As is conventional, the wallboard-forming gypsum slurry 130 is dispensed from the pin mixer 51 and onto the facing sheet 120, which is supported by the forming table as it travels past the pin mixer. It is contemplated that the wallboard forming devices may be raised and lowered into and out of proper operating position by any of several means that will become apparent to those skilled in the art in view of the present disclosure.

In accordance with conventional wallboard forming operations, a second roll 120 of facing material 121 in sheet form is provided. The facing sheet 121 is received by forming roll 114 and applied to the upper surface of the gypsum slurry 130. The carrier belt 81 serves as a conventional wallboard carrier or setting belt disposed under or at least immediately downstream of the forming rolls 114/115 and functions to support the wallboard and carry it away from the forming means.

The continuous wet fiberboard process described above permits on-line dewatering and facilitates the manufacture of nominal 0.125 inch to about 1.5 inch thick fiberboard products. This equipment can be adapted for different types of boards by alternating the number of press rolls as well as the speed of the belt. Cement and/or gypsum can be used in the starting materials and the final boards can be embossed with light or heavy patterns, such as wood grains. The process of this invention can permit the manufacture of fiberboards having a density of about 30–85 lbs./ft.$^3$ and widths from about 6 inches to about 12 feet. Additives can be introduced in both the wet or dry state either through the stucco metering or the pulping systems, such as the gauge water. This novel process can also produce different formulations of layers deposited through separate head boxes onto the moving belt for achieving different densities and finishes on the face and back of selected boards.

Fiberboard Properties

The processes of the present invention can be used to make unfaced fiberboard which has a substantially uniform and homogeneous composition throughout its thickness. The term "unfaced" is used herein to mean that the fiberboard layer is preferably not faced with a sheet material, for example, the paper or glass fiber mat that is often used as a facing material for gypsum wallboard, although structurally improved faced-products can be readily produced by employing the fiberboard compositions of this invention in the cores of such boards.

As mentioned above, it is desirable that the fiberboard layer of the present invention have a density within the broad range of about 30–85 lbs./ft.$^3$, and preferably about 50–65 lbs./ft.$^3$. In order to achieve the flexural strength and screw-holding capacity values referred to above (30 lbs. and 400 lbs. respectively) in fiberboards having densities much below 60 lbs./ft.$^3$, there should be included in the composition from which the building material is made relatively high amounts of binder polymer, for example, about 1 wt. % to about 3 wt. % based upon the solids content. For applications in which such flexural strength characteristics and screw-holding capacity are not considered important, the use of a binder polymer can be absent or provided in smaller amounts. The density of the fiberboard can be controlled by the use of pressure in forming the product and/or by the use of a low-density material, for example, expanded perlite.

The flexural strength of fiberboards within the scope of this invention generally should be at least about 30 lbs., preferably at least about 40 lbs. (½ inch thick sample tested in accordance with a modified ASTM C 473-86a procedure, as described in U.S. Ser. No. 420,362). In general, the screw-holding capacity of fiberboards within the scope of this invention is preferably at least about 400 lbs., and in a building board to be used as fire door edge banding, preferably at least about 600 lbs., and most preferably in excess of about 700 lbs., when tested in accordance with the procedures otherwise described in U.S. Ser. No. 420,362 for one inch samples.

Although various process and equipment embodiments have been illustrated, this was for the purpose of describing and not limiting this invention. Various modifications, which will become apparent to one skilled in the art, are within the scope of this invention as set forth in the attached claims.

What is claimed is:

1. An apparatus for use in alternatively and selectively forming wallboard or fiberboard comprising:

means for providing a fiberboard-forming slurry;

means for producing a substantially continuous wet web from said fiberboard-forming slurry;

means for forming a substantially continuous green board from said wet web;

means for dispensing a wallboard-forming gypsum slurry onto a continuously moving wallboard substrate to form a slurry-laden substrate;

means for introducing at least one continuously moving wallboard substrate beneath said dispensing means;

first carrier means located past said dispensing means for carrying said slurry-laden substrate or said green board away from said dispensing means;

second carrier means for receiving said green board and carrying said green board past said dispensing means and to said first carrier means; and means for selectively introducing and withdrawing said second carrier means from operative association with said first carrier means.

2. An apparatus for use in alternatively and selectively forming wallboard or fiberboard comprising:

admixing means for mixing a hydratable gypsum, a source of paper fiber, and water to form a substantially homogeneous, fiberboard-forming slurry;

dewatering means for removing a portion of said water from said fiberboard-forming slurry to produce a substantially continuous wet web;

pressing means for applying a compressive force to said wet web to form a substantially continuous green board;

cutting means for cutting said substantially continuous green board into individual uncured lengths;

means for distributing a wallboard-forming gypsum slurry onto a continuously moving wallboard substrate to form a slurry-laden substrate;

means for introducing at least one continuously moving wallboard substrate beneath said distributing means in a position to receive slurry from said distributing means;

first carrier means located past said distributing means for carrying said slurry-laden substrate or said individual uncured lengths away from said distributing means;

second carrier means disposed between said cutting means and said first carrier means for receiving said individual uncured lengths and carrying said individual uncured lengths past said distributing means and to said first carrier means; and means for selectively introducing and withdrawing said second carrier means from operative association with said first carrier means.

3. An apparatus for use in alternatively and selectively forming wallboard or fiberboard comprising:

admixing means for mixing a hydratable gypsum, a source of paper fiber, and water to form a substantially homogeneous, fiberboard-forming slurry;

dewatering means for removing a portion of said water from said fiberboard-forming slurry to produce a substantially continuous wet web;

pressing means for applying a compressive force to said wet web to form a substantially continuous green board;

cutting means for cutting said substantially continuous green board into individual uncured lengths;

means for dispensing a wallboard-forming gypsum slurry onto a continuously moving wallboard substrate to form a slurry-laden substrate;

means for introducing at least one continuously moving wallboard substrate beneath said dispensing means in an operative position to receive slurry from said dispensing means;

means for selectively introducing and withdrawing said substrate introducing means from operative association with said means for dispensing wallboard-forming gypsum slurry;

first carrier means located past said dispensing means for carrying said slurry-laden substrate or said individual uncured lengths away from said dispensing means;

second carrier means disposed between said cutting means and said first carrier means for receiving said individual uncured lengths and carrying said individual uncured lengths past said dispensing means and to said first carrier means; and means for selectively introducing and withdrawing said second carrier means from operative association with said first carrier means.

4. The apparatus of claim 3, wherein said admixing means comprises pulping means for fiberizing said source of paper fiber in water.

5. The apparatus of claim 4, wherein said admixing means comprises means for mixing said source of paper fiber, water, and hydratable gypsum to form a homogeneous suspension and for pumping said suspension.

6. The apparatus of claim 3, including a head box means for holding said homogeneous slurry and disposing said slurry in a uniform thickness onto a web forming means.

7. The apparatus of claim 6, wherein said head box means comprises a longitudinally disposed head box.

8. The apparatus of claim 7, wherein said web forming means comprises a continuous travelling mesh belt.

9. The apparatus of claim 8 wherein said dewatering means comprises vacuum assisted suction means located along said travelling mesh belt for removing water from said slurry.

10. The apparatus of claim 8, wherein said travelling mesh belt comprises a porous polymeric weave.

11. The apparatus of claim 10 wherein said dewatering means comprises vacuum assisted suction means located along said travelling mesh belt for removing water from said slurry.

12. The apparatus of claim 11 wherein said suction means comprises a series of drain pipes located along said travelling mesh belt for facilitating removal of said water.

13. The apparatus of claim 3, wherein said pressing means is capable of reducing the water content of said wet web to about 50–70 wt. %.

14. The apparatus of claim 13, wherein said travelling mesh belt has the capacity to travel at a rate of about 25–100 ft./min.

15. The apparatus of claim 3, wherein said pressing means comprises adjustable prepress roll means for configuring said wet web.

16. The apparatus of claim 15, wherein said adjustable prepress roll means comprises actuation means for adjusting the thickness of said wet web for a preselected final fiberboard thickness.

17. The apparatus of claim 16, wherein said pressing means comprises a top porous belt disposed in contact with said wet web.

18. The apparatus of claim 3 wherein said first carrier means comprises setting belt means.

* * * * *